United States Patent Office 3,575,927
Patented Apr. 20, 1971

3,575,927
BROMINATED POLYESTERS
Winston J. Jackson, Jr., and John R. Caldwell, Kingsport, Tenn., assignors to Eastman Kodak Company, Rochester, N.Y.
No Drawing. Continuation-in-part of application Ser. No. 686,740, Nov. 29, 1967. This application June 27, 1969, Ser. No. 837,323
Int. Cl. C08g 17/14
U.S. Cl. 260—47
17 Claims

ABSTRACT OF THE DISCLOSURE

Polyesters having improved resistance to burning prepared by contacting a solution of the polyester with a brominating agent in the presence of a chlorinating agent, the molar ratio of bromine atoms to chlorine atoms being greater than 1:1 whereby the polyester is halogenated substantially uniformly throughout.

---

This invention relates to brominated polyesters and to the process for preparing such polyesters. More particularly, this invention relates to the homogeneous bromination of polyesters in solution and to shaped articles, such as particles, fibers and films formed from these brominated polyesters.

It is of course well known that a large variety of relatively high melting, linear polyesters useful as fibers, films, and the like may be prepared by reacting dibasic acids with diols. Many of these polymers, particularly those prepared from aromatic acids, are quite insoluble, however, in the more volatile and desirable polymer solvents such as methylene chloride, chloroform, and dioxane which boil at 40° C., 61° C., and 101° C., respectively; and consequently, melt spinning, extruding, and molding represent the normal methods for forming these polymers into useful shapes. In fact, many of the polymers are difficult to dissolve in solvents such as tetrachloroethane and pentachloroethane, which boil at 146° C., and 159° C., respectively. Moreover, polyesters are flammable and, therefore, limited to products which are not to be subjected to high temperatures and open flames. Thus, a need exists for flame resistant linear polyesters that are soluble in low-boiling solvents.

One method which has heretofore been suggested for producing a variety of flame-resistant polyesters having greater processability by virtue of their solubility in low-boiling solvents involved passing chlorine through a solution of the polymer in the presence of suitable chlorination promoting means thereby producing a chlorinated polyester. However, it has been found that, depending upon the polyester structure, the chlorine content of the polyester must be above about 20 percent by weight before thin polyester films and fibers become self-extinguishing. By "self-extinguishing" it is meant that a fiber or film of the polymer stops burning moments after it is removed from a flame. This high percentage of chlorine often adversely affects certain properties of the polyester such as its crystallinity, thereby greatly restricting the products in which the polymer can be used.

Therefore, it is an object of this invention to provide flame resistant halogenated polyesters having many of the desirable properties such as toughness, relatively high melting points and the like, of the heretofore known unhalogenated polyesters. It is a further object of this invention to provide halogenated polyester dopes which can be processed into formed articles by extruding, casting, drawing, spinning, and slush molding; and to provide a commercially practicable process for preparing such versatile and processable polyesters. It is a still further object of this invention to provide a process whereby various polyesters may be substantially uniformly brominated throughout in a controlled manner to desired degrees without so reducing the physical and chemical properties of the polyesters that they are no longer useful for many of their intended purposes. It is yet another object of this invention to provide flame resistant shaped articles such as particles, fibers and films of a polyester that is substantially uniformly brominated throughout.

These and other objects hereinafter becoming apparent have been achieved in accordance with the present invention through the discovery that highly polymeric, linear polyesters derived from (A) carbonic acid, a bifunctional hydroxycarboxylic acid, or a bifunctional dicarboxylic acid and (B) a bifunctional diol, in solution in suitable halogenated hydrocarbons, may be substantially uniformly brominated in a controlled manner to desired degrees without so reducing the physical properties of the polymers that they do not have considerable utility in forming shaped articles. The term "shaped articles" as used herein includes particles, filaments, staple fibers, yarns, fabrics, carpets, tricots, films, sheets, coatings, packaging, film supports, electrical insulation, and other extruded, molded, cast or otherwise formed articles.

Moreover, it has been found in accordance with the present invention that the polyesters may be brominated without excessive degradation of the polymer by passing chlorine, at a temperature between about 0° and 150° C., through a solution of the polymer in the presence of an excess amount of bromine, whereby the polyester is substantially uniformly brominated throughout in a controlled manner to desired degrees.

It is to be noted that the bromine in the polyester is attached to non-aromatic carbon atoms and that the polyesters may be rendered self-extinguishing if it is brominated by 10 to 15 weight percent, depending upon the polyester structure. The amount of bromine necessary to substantially improve the flame resistance of a polyester material is about 3 weight percent of the material. Also, it has been found that when the bromine content of the polymers is about about 10 percent by weight, they become more soluble in such volatile and easily flashed solvents as methylene chloride, chloroform and dioxane. Consequently, clear, tough films can be cast, and high-tenacity, self-extinguishing fibers spun from their solutions. Such films can be used as nonflammable protective coatings, photographic film base, electrical insulation, dielectrics for capacitors, etc. The polymers can also be used as an ingredient in paints to make them fire-resistant.

Although self-extinguishing polyestesr can also be obtained by chlorination as described in our U.S. Pat. 3,356,631, it has been found that only about one-half as much bromine as chlorine is required to obtain the same fire resistance.

The term "polyester" as used in this application includes polycarbonates and applies to polyesters (including both homopolyesters and copolyesters) which contain hydrogen atoms attached to non-aromatic carbon atoms. The reason for this limitation is because aromatic hydrogen atoms are displaced to only a relatively small extent under the bromination conditions used.

The polyesters which are halogenated are high molecular weight polyesters derived from (A) carbonic acid, a bifunctional hydrocarboxylic acid, or a bifunctional dicarboxylic acid and (B) a bifunctional diol. The term "carbonic acid" includes derivatives thereof, such as phosgene, bromophosgene, diethyl carbonate, and diphenyl carbonate. The inherent viscosities of the polyesters are at least 0.5 and preferably at least 0.7.

Examples of suitable difunctional hydroxycarboxylic acids are those having up to 40 carbon atoms, such as p-hydroxybenzoic, p-hydroxymethylbenzoic, and hydroxypivalic acids.

Suitable dicarboxylic acids are aliphatic, alicyclic, and aromatic dicarboxylic acids having up to 40 carbon atoms. Examples of such acids include oxalic; malonic; dimethylmalonic; succinic; glutaric; adipic; 2-methyladipic; trimethyladipic; pimelic; 2,2-dimethylglutaric; 3,3-diethylsuccinic; azelaic; sebacic; suberic; fumaric; maleic; itaconic; 1,3-cyclopentanedicarboxylic; 1,3-cyclopentanedicarboxylic; 1,2 - cyclohexanedicarboxylic; 1,3 - cyclohexanedicarboxylic; 1,4 - cyclohexanedicarboxylic; 1,4-cyclohexenedicarboxylic; phthalic; terepthalic; isophthalic; 4-methylisophthalic; t-butyl isophthalic; 2,5-norbornane dicarboxylic; 1,4-naphthalic; diphenic; 4,4'-oxydibenzoic; 4,4'-methylenedibenzoic; diglycolic; thiodipropionic; 4,4'-sulfonyldibenzoic; 2,5-naphthalenedicarboxylic; 2,6-naphthalenedicarboxylic; and 2,7 - naphthalenedicarboxylic acids. It will be understood that the corresponding esters of these acids are included in the term "dicarboxylic acid." Examples of these esters include dimethyl 1,4-cyclohexanedicarboxylate; dimethyl 2,6-naphthalenedicarboxylate; dimethyl 4,4'-sulfonyldibenzoate; dimethyl isophthalate; dimethyl terephthalate; and diphenyl terephthalate. Copolyesters may be prepared using two or more of the above dicarboxylic acids or esters thereof. Other derivatives (e.g., the acid chlorides and anhydrides) may also be used to prepare these polyesters.

Suitable diols for preparing these polyesters are aliphatic, alicyclic, and aromatic diols having up to 40 carbon atoms. Examples of such diols include ethylene glycol;
diethylene glycol;
1,2-propylene glycol;
2,4-dimethyl-2-ethylhexane-1,3-diol;
2,2,4-trimethyl-1,3-pentanediol;
2,2-dimethyl-1,3-propanediol;
2-ethyl-2-butyl-1,3-propanediol;
2,2-diethyl-1,3-propanediol;
2-methyl-2-propyl-1,3-propanediol;
3-ethyl-2-isobutyl-1,3-propanediol;
1,3-butanediol;
1,4-butanediol;
1,4-butenediol;
1,5-pentanediol;
1,6-hexanediol;
1,10-decanediol;
2,2,4-trimethyl-1,6-hexanediol;
1,4-cyclohexanediol;
1,2-cyclohexanedimethanol;
1,3-cyclohexanedimethanol;
1,4-cyclohexanedimethanol;
2,2,4,4-tetramethyl-1,3-cyclobutanediol;
o-, m-, and p-xylylene diols;
4,4'-thiodiphenol;
4,4'-methylenediphenol;
4,4'-dihydroxybiphenyl;
hydroquinone;
resorcinol;
4,4'-sulfonyldiphenol;
4,4'-oxydiphenol;
4,4'-isopropylidenediphenol;
4,4'-isopropylidenebis(2,6-dichlorophenol);
4,4'-cyclohexylidenediphenol;
4,4'-(2-norbornylidene)-diphenol;
4,4'-(hexahydro-4,7-methanoindan-5-ylidene)diphenol;
2,5-naphthalenediol; and
2,5-norbornanediol.

Copolyesters may be prepared using two or more of the above diols. Other dihydric phenols listed in U.S. Patents 3,030,335 and 3,317,466 may be used. Two or more dicarboxylic acids or diols may be used to give copolyesters or block polymers.

The preparation of these polyesters, which should have an I.V. of at least about 0.5, as well as the manufacture of particles, fibers and films therefrom, are accomplished according to methods well known in the art. Therefore, these various methods need not be detailed herein.

Although the exact scientific basis behind this invention is not fully understood it is believed to involve the following principles:

Bromination of polyesters takes place at an appreciably slower rate than chlorination. Our new, improved process consists of carrying out the bromination reaction in the presence of chlorine which, we have found, greatly increases the rate of bromination and the degree of bromination of the polymer. The reason for this, presumably, is because chlorine radicals are more energetic than bromine radicals and react more readily with the polyester to remove a hydrogen atom in the first step of the halogenation mechanism:

    (Equation 1)

wherein R is the remainder of the polyester chain and X· is a bromine or chlorine free radical. According to T. L. Cottrell, "The Strengths of Chemical Bonds," 2nd edition, Butterworths, London, 1958, the energy required to dissociate a hydrocarbon, R:H, wherein H is a tertiary hydrogen atom is about 89 kcal./mole (94 kcal./mole for a secondary hydrogen and 100 kcal./mole for a primary hydrogen atom); the energy released when an HBr bond is formed is 87 kcal./mole, and 102 kcal./mole is released when an HCl bond is formed. Consequently, Equation 1 is endothermic when X is bromine and exothermic when X is chlorine. Therefore, it is assumed that this step of the halogenation takes place considerably more readily when X is chlorine. The second step of the halogenation is quite exothermic for both chlorine and bromine:

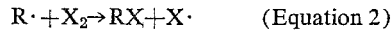    (Equation 2)

The bond dissociation energy for bromine is 46 kcal./mole, and that for chlorine is 57 kcal./mole; the energy released by formation of RBr is about 65 kcal./mole, and that for FCl is about 81 kcal./mole. Equation 1, therefore, is the rate-determining step.

Since chlorination takes place more readily than bromination, it is necessary to use an excess of bromine, relative to that of chlorine, if bromination is to be the dominant reaction. When a free radical on the polyester chain is produced by chlorine (Equation 1), an excess of bromine over chlorine is present for this radical to react with (Equation 2). Of course some chlorination will also take place, but the amount of such chlorination can be controlled through regulating the bromine to chlorine ratio. That is, if the bromine to chlorine ratio is high, then the ratio of bromination that will occur on the polyester chain will be higher than the chlorination that will occur. Thus, the average molar concentration of bromine to chlorine should be greater than 1:1. Normally, the average molar concentration of bromine should be at least 2 times and preferably at least 3 times that of the chlorine. Formation of the chlorine free radicals to initiate the reaction may be accomplished with visible or ultraviolet radiation, heat, a free radical catalyst, or a combination of these.

The polyesters are brominated in accordance with the present invention by passing chlorine into solutions or suspensions containing the polymers and an excess of bromine while illuminating the solutions or suspensions with ultraviolet or visible light or while periodically adding a free-radical catalyst or halogenation promoter instead of, or in addition to, heat or illumination. Since the catalyst initiates the free radical reaction by first dissociating into free radicals itself, the catalyst which is used depends upon the reaction temperature, which must be sufficiently high to cause dissociation at a reasonable rate. Examples of suitable free radical catalysts include acetyl peroxide, benzoyl peroxide, lauroyl peroxide, azobisisobutyronitrile, t-butylperoxypivalate, diisopropylperoxydicarbonate, hydrogen peroxide, the alkali metal persulfates, and t-butylperoxide. The preferred method is ultraviolet illumination.

The bromination can be carried out at substantially atmospheric pressure or higher and from about 0 to about 100° C. but temperatures of 20°–40° C. are preferred. Appreciable degradation of the polymers takes place at the higher temperatures. The bromination reaction is more efficient if the polyester is in solution in a relatively inert solvent, but polymers which are sufficiently swollen by a solvent may also be brominated. The preferred solvents are tetrachloroethane and chlorobenzene. Trichloroacetic acid may be added to facilitate solution. It is not necessary for an acid acceptor to be in the reaction mixture, but it is advantageous to use water to remove HCl and HBr from the organic phase. It is noted that when trichloroacetic acid may be employed to facilitate solution, water is not employed since trichloroacetic acid is soluble in water.

Bromine is the preferred brominating agent, but others may be used under the above reaction conditions. Examples of other effective brominating agents include sulfuryl bromide, phosphorus pentabromide, t-butyl hypobromite, sodium hypobromite, potassium hypobromite, and hypobromous acid. Preferably, chlorine gas is used in the process. However, examples of other effective chlorine agents include sulfuryl chloride, phosphorous pentachloride, t-butyl hypochlorite, sodium hypochlorite, potassium hypochlorite, and hypochlorous acid.

The amount of bromine which must be substituted on the polymer chain in order to make it self-extinguishing depends upon the structure of the polyester and other related factors. In general, polyesters become self-extinguishing when they contain about ten to fifteen percent bromine, and they have substantially improved resistance to burning when they contain at least about three percent bromine. If 0.5 to 10 weight percent and preferably about 3 weight percent of an antimony compound (e.g., antimony trioxide, antimony chloride, and antimony oxychloride) is incorporated in the polymer, less bromine is required in order for it to have improved resistance to burning or to be self-extinguishing. Only about 6 to 10 percent bromine is required to make many polyester films and fibers self-extinguishing, for instance, when they contain three percent antimony trioxide.

After completion of the bromination, aqueous sodium metabisulfite solution may be added to ensure reaction of the excess bromine which remains. After the polymer solution is thoroughly washed with water to remove all salts, it is slowly added to methanol or some other nonsolvent to precipitate the polymer.

Although most of the present brominated polymers will degrade when subjected to temperatures appreciably above 150° C. for long periods of time, their thermal stability can be appreciably improved by adding 0.1–4% of a stabilizer compound of one or more of the following types: organo-tin-sulfur, organo-tin, epoxy, aziridinyl, urea-phosphite, unsaturated aliphatic, fatty acid salt (cadmium, zinc or tin), or powdered calcium carbonate. These stabilizers may be added to the polymer, for example, by dissolving or suspending them in the polymer dope, or by dissolving or suspending them in a solvent such as methanol in which the polymer is insoluble, adding the polymer, mixing, and then evaporating to dryness. Other additives or stabilizers also may be added, such as ultraviolet stabilizers, pigments, and antioxidants.

This invention will be further illustrated by the following examples of preferred embodiments. All ratios given in the following examples are molar and all percentages are given in weights as based on the weight of the polyester. The inherent viscosities are measured at 25° C. in 60/40 phenol/tetrachloroethane at a concentration of 0.25 g./100 ml.

EXAMPLE 1

Twenty-seven and four-tenths grams (0.1 mole based on the molecular weight of a polymer unit) of a polyester (I.V. 0.71) of 1,4-cyclohexanedimethanol and 50/50 terephthalic acid/isophthalic acid is dissolved in 300 ml. of chlorobenzene in a 1-l. flask. Thirty-two grams (0.2 mole) of bromine and 150 ml. of water are then added to the flask. While this mixture is stirred and irradiated with a 300-watt lamp (visible radiation), 7.1 g. (0.1 mole) of chlorine gas is slowly bubbled through the solution over a two-hour period of time. A water bath is employed to hold the temperature of the solution at 25–35° C. At the end of the two-hour period of time the chlorobenzene layer containing the brominated polymer is separated, diluted with more chlorobenzene, washed with aqueous sodium metabisulfite solution and then thoroughly washed with water. The brominated polymer is precipitated by slowly adding the chlorobenzene solution to methanol while stirring rapidly. The brominated polymer particles are then dried in a vacuum oven at 70° C. and analyzed. The inherent viscosity of the polymer particles is 0.56, and they contain 24.6 percent bromine and 6.4 percent chlorine. A 3-mil film of the brominated polymer, cast from chloroform, is immediately self-extinguishing on removal from a flame. It has a tensile strength of 10,500 p.s.i., an elongation of 10%, a modulus of $3.5 \times 10^5$ p.s.i., and a heat-distortion temperature of 148° C.

EXAMPLE 2

The presence of a chlorinating agent is essential to the halogenation of the polyester. To illustrate this fact the procedure of Example 1 is repeated with the exception that no chlorine gas is bubbled through the solution. The resulting polymer particles contain only 1.5 percent bromine and a 3-mil film produced from the particles is not self-extinguishing.

EXAMPLE 3

The general procedure of Example 1 is used for brominating bisphenol A polycarbonate (I.V. 1.01) at 25° C. After 8.5 g. of chlorine has been added during 3 hours, 90 ml. of the reaction mixture (Sample A) is removed and treated as in Example 1. After 5.5 g. additional chlorine is passed into the reaction mixture during 1.5 hours, Sample B is washed and isolated in the same manner as Sample A. Sample A has an I.V. of 0.95 and analyzes for 5.1% bromine and 1.5% chlorine. A 2-mil film, cast from chloroform, is ignited by a Bunsen burner. It burns for about 5 seconds and then extinguishes itself. Sample B has an I.V. of 0.77 and analyzes for 13.6% bromine and 4.5% chlorine. A 2-mil film, cast from chloroform, is self-extinguishing and has the following properties: tensile strength 10,300 p.s.i., elongation 4%, modulus $3.9 \times 10^5$ p.s.i., heat-distortion temperature 118° C.

EXAMPLE 4

The reaction of Example 3 is repeated except that the chlorine is omitted. A gelatinous, insoluble product is obtained which contains only 0.7% bromine. This illustrates the necessity of having a chlorinating agent present if the polyester is to be brominated to any appreciable degree within a reasonable time period.

EXAMPLE 5

Poly(ethylene terephthalate) (19.2 g.) having an inherent viscosity of 1.16 is dissolved in a mixture consisting of 120 ml. of 1,1,2,2-tetrachloroethane and 35 g. of trichloroacetic acid. Bromine (32 g.) is added. While this solution is stirred and irradiated with a 275-watt ultraviolet lamp, chlorine is slowly passed into the mixture for 1 hour at the rate of about 3 g./hr. The solution is maintained at 15–20° C. during this time with a water bath. The solution is then washed with water, aqueous sodium metabisulfite, and then thoroughly with water. The polymer is precipitated by slowly adding the solution to hexane while stirring. It has an inherent viscosity of 0.61 and contains 6.2% bromine and 2.9% chlorine. A film is not quite self-extinguishing.

EXAMPLE 6

The presence of a chlorinating agent is essential to the bromination of the polyester. To illustrate this fact the reaction of Example 5 is repeated except that the chlorine is omitted. The product produced contains only 0.2% bromine.

EXAMPLE 7

The procedure of Example 3 is repeated using the following polymers:

(A) Polycarbonate of 4,4'-(2-norbornylidene)diphenol
(B) Polyester of trans-1,4-cyclohexanedicarboxylic acid and 2,2,4,4-tetramethyl-1,3-cyclobutanediol
(C) Polyester of 65/35 terephthalic acid/isophthalic acid and bisphenol A
(D) Polyester of terephthalic acid and 2,2-dimethyl-1,3-propanediol
(E) Polyester of 50/50 2,6-naphthalenedicarboxylic acid/isophthalic acid and 1,3-cyclohexanedimethanol
(F) Polyester of 4,4'-oxydibenzoic acid and 1,10-decanediol
(G) Polyester of 80/20 terephthalic acid/sebacic acid and 2,2,4,4-tetramethyl-1,3-cyclobutanediol Films prepared from these polymers contain from 10–20 percent bromine with lesser amounts of chlorine and are self-extinguishing.

The invention has been described in detail with particular reference to preferred embodiments thereof, but it will be understood that variations and modifications can be effected within the spirit and scope of the invention as described hereinabove and as defined in the appended claims.

We claim:

1. A process for halogenating comprising contacting with bromine in the presence of chlorine, at a temperature in the range of about 0° C. to about 100° C., a solution of a highly polymeric linear polyester derived from (A) a bifunctional hydroxycarbylic acid, or
(B) a bifunctional diol and an acid component selected from the group consisting of carbonic acid and a bifunctional dicarboxylic acid, wherein the polymer is brominated substantially uniformly throughout, the amount of bromine in the polymer is at least about three percent of the weight of the polymer and the bromine is attached primarily to non-aromatic carbon atoms.

2. The process of claim 1 wherein the polyester is contacted in the presence of a halogenation promoter being selected from the group consisting of acetyl peroxide, benzoyl peroxide, lauroyl peroxide, azobisisobutyronitrile, t-butylperoxy pivalate, di-isopropylperoxydicarbonate, hydrogen peroxide, the alkali metal persulfates, and t-butylperoxide.

3. The process of claim 1 wherein the polyester is derived from
   a difunctional dicarboxylic acid and
   an aromatic, alicyclic or aliphatic diol.

4. The process of claim 1 wherein the polyester is derived from
   a mixture of isophthalic acid and terephthalic acid and
   4,4' - isopropylidenediphenol or 1,4 - cyclohexanedimethanol.

5. The process of claim 1 wherein
   the bifunctional dicarboxylic acid is terephthalic acid and
   the bifunctional diol is ethylene glycol, 1,4-butanediol or 1,4-cyclohexanedimethanol.

6. The process of claim 1 wherein the polyester is derived from carbonic acid and 4,4'-isopropylidene diphenol.

7. The process of claim 1 wherein the polyester is polypivalolactone.

8. The process of claim 1 wherein the polymer additionally contains from 0.5 to 10 weight percent antimony trioxide.

9. The process of claim 1 wherein the amount of bromine is at least 10 weight percent.

10. A fiber of film consisting essentially of a highly polymeric linear polyester derived from (A) a bifunctional hydroxycarbylic acid or
    (B) a bifunctional diol and an acid component selected from the group consisting of carbonic acid and a bifunctional aromatic dicarboxylic acid halogenated according to the process of claim 1, wherein the polyester contains chlorine and is brominated substantially uniformly throughout, the polymer contains from about 3 to 50 percent by weight bromine and the bromine and chlorine are attached to non-aromatic carbon atoms.

11. The fiber of film of claim 10 wherein the polyester is derived from
    a bifunctional aromatic dicarboxylic acid and
    an aromatic, alicyclic or aliphatic diol.

12. The fiber or film of claim 10 wherein the polyester is derived from
    a mixture of isophthalic acid and terephthalic acid and
    4,4' - isopropylidenediphenol or 1,4 - cyclohexanedimethanol.

13. The fiber or film of claim 10 wherein
    the bifunctional dicarboxylic acid is terephthalic acid and
    the bifunctional diol is ethylene glycol, 1,4-butanediol or 1,4-cyclohexanedimethanol.

14. The fiber or film of claim 10 wherein the polyester is derived from carbonic acid and 4,4'-isopropylidenediphenol.

15. The fiber or film of claim 10 wherein the polyester is polypivalolactone.

16. The fiber or film of claim 10 containing from 0.5 to 10 weight percent antimony trioxide in the fiber or film.

17. The fiber or film of claim 10 wherein the amount of bromine is at least 10 weight percent.

References Cited

UNITED STATES PATENTS

| | | | |
|---|---|---|---|
| 2,826,602 | 3/1958 | Bortnick et al. | 260—485 |
| 2,829,070 | 4/1958 | Osborn | 117—93 |
| 3,243,480 | 3/1966 | Anderson et al. | 260—869 |
| 3,274,293 | 9/1966 | Eilfers et al. | 260—869 |
| 3,285,995 | 11/1966 | Nametz et al. | 260—865 |
| 3,356,631 | 12/1967 | Jackson et al. | 260—31.2 |
| 3,454,672 | 7/1969 | Jackson et al. | 260—860 |
| 2,607,802 | 8/1952 | Britton et al. | 260—544 |
| 2,658,086 | 11/1953 | Ruh et al. | 260—653 |

OTHER REFERENCES

Christie et al.: Trans. Faraday Soc. 55, 1139–48 (1959) (abstr. supplied).

Schulek et al. Ann. Univ. Sci. Budapest. Rolando Eotvos Nominatae, Sect. Chim. 2, 139–43 (1960) (abstr. supplied).

MELVIN GOLDSTEIN, Primary Examiner

U.S. Cl. X.R.
260—75, 78.3, 96